April 30, 1963 S. J. CASSIDY 3,087,293
APPARATUS TO HARVEST SEA PRODUCTS
Filed Dec. 5, 1960 2 Sheets-Sheet 2
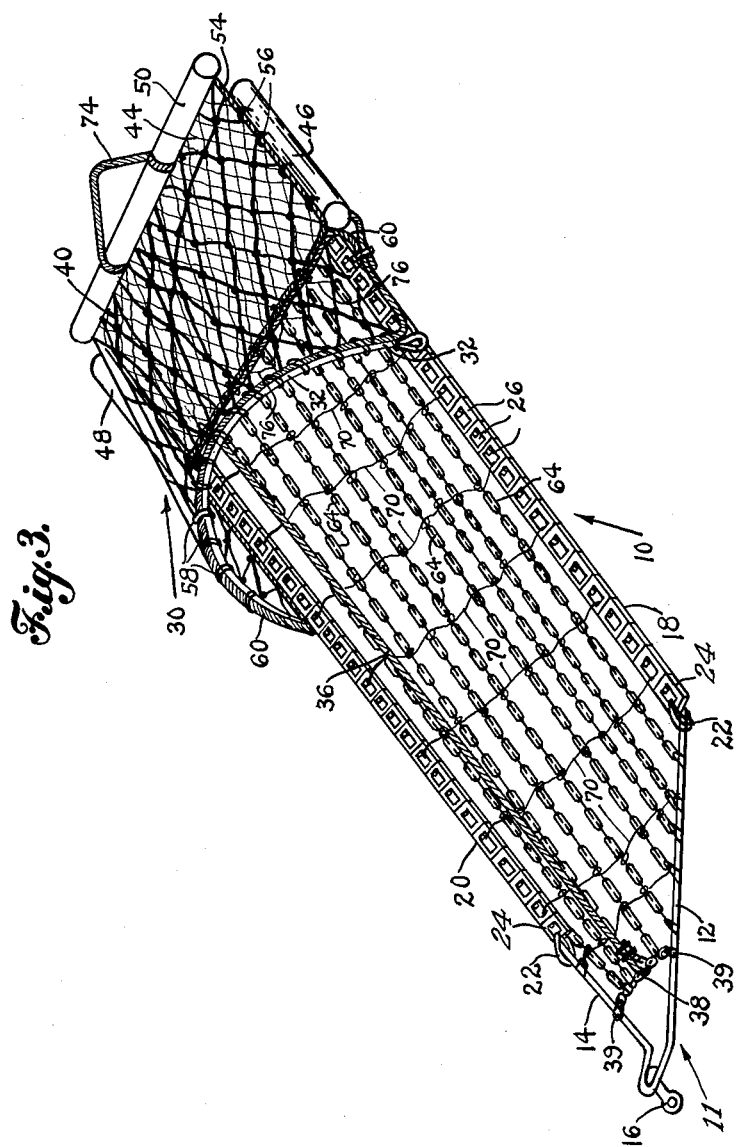
INVENTOR.
Stephen J. Cassidy
BY Harold E. Cole
Attorney United States Patent Office 3,087,293
Patented Apr. 30, 1963

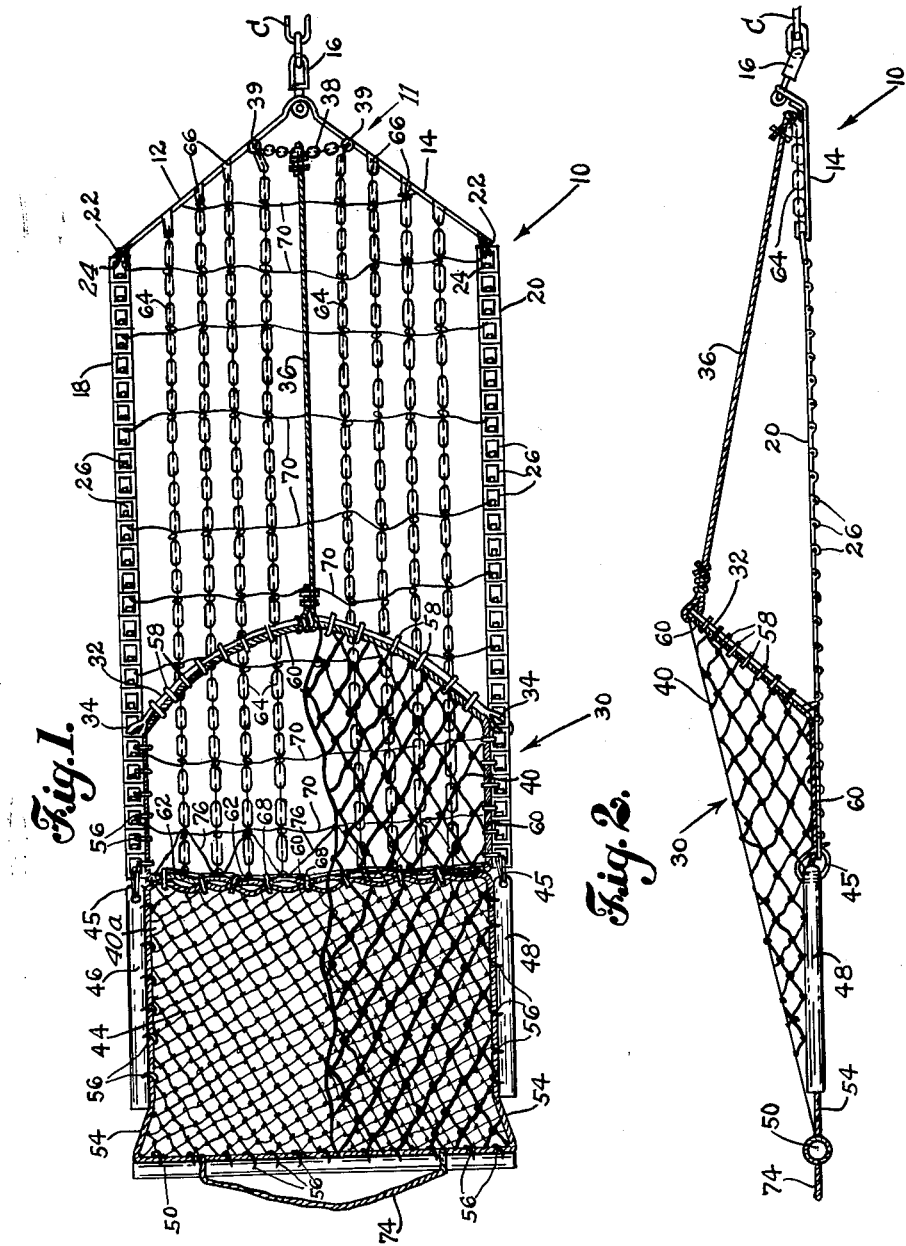

3,087,293
APPARATUS TO HARVEST SEA PRODUCTS
Stephen J. Cassidy, 979 Rodney French Blvd.,
New Bedford, Mass.
Filed Dec. 5, 1960, Ser. No. 73,810
13 Claims. (Cl. 56—8)

This invention relates to apparatus to harvest products growing under water, such as sea moss.

One object of my invention is to provide apparatus that will break off or otherwise remove growing sea products, such as sea moss, and gather it into a receptacle, without the aid of human labor, and that can be used in rough weather.

Another object is to provide apparatus that can be dragged along a sea bottom, as by a boat, sever or break off sea products growing under water and also receive the severed product and temporarily store it in a receptacle that is part of said apparatus.

A further object is to provide such apparatus that is formed of well-known parts that can be assembled with the use of simple tools and equipment, so that my apparatus can be manufactured at a low cost from materials already available.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 1 is a top plan view of my apparatus to harvest sea products, part of the net member being shown broken away.

FIG. 2 is a side elevational view thereof, showing the mouth of the net member open.

FIG. 3 is a perspective view thereof, likewise showing the mouth open.

As illustrated, my apparatus has a basic frame 10 having a front 11 formed with two rigid front members 12 and 14 that extend from the outside of my apparatus diagonally towards each other. Where they meet, at their front ends, connection with a shackle 16 is made, to which a cable C or other tow rope may be attached to drag my apparatus over the rocky bottom of the sea.

Said basic frame 10 has two side members 18 and 20 shown as chains, one end of each being attached respectively to said front members 12 and 14 by connectors 22 that connect with front links 24 forming parts of said side members 18 and 20. Each of the latter is preferably made of well-known square links 26 of metal including link 24 which are joined so as to permit said chain considerable flexing movement longitudinally and thus conform to rocks and otherwise rough sea bottom as my apparatus is dragged thereover during the harvesting operation. These square links 26 do not permit any substantial lateral movement so said basic frame 10 remains relatively rigid laterally with its sides well spread apart at all times during use.

At the rear part of my apparatus is a receiving net member 30 to receive and hold the sea moss as harvesting continues. At the front it has a curved, rigid support 32 which is crescent-shaped, as shown, and that is movably attached by links 34 to said frame side members 18 and 20. A rope 36 of buoyant material, is attached to said support 32, extending and being tied to a short cross-chain 38 attached to rings 39 on said front members 12 and 14. This curved support 32 also serves to keep said side members 18 and 20 laterally apart at said net member.

Said net member 30 has an upper front portion 40 of buoyant material, such as cloth netting, the front part of which is connected to said curved support 32 and which provides a mouth or entrance for the net member when open, and also a guide to an enclosure or receptacle portion 44 immediately rearward thereof. Said receptacle portion 44 includes an upper part 40a that continues rearwardly from said upper front portion 40. As my apparatus moves along the sea bottom, said upper front portion 40 rises, as shown in FIG. 2, thus providing an entrance for the product harvested, such as sea moss. Said rope 36 keeps said front portion 40 from rising beyond an angle of approximately 45 to 60 degrees to horizontal, since it cannot swing backwards from said open position beyond the point permitted by said rope. Thus an open mouth for the net member is provided that can open only to the desired degree while harvesting. The rear portion 44 of said net member provides the receptacle portion in which the sea moss enters and is retained until the net is emptied.

Opposite said net receptacle portion 44 and attached by wires 45 to the rear ends of said side members 18 and 20, are net frame members or supports 46 and 48 respectively that are made of wood or other buoyant material. Another buoyant net frame member or support 50 is attached to said net upper portion 40a at the rear end thereof. Since it is desirable that the bottom of said net enclosure portion 44 does not drag hard on the sea bottom, said supports 46, 48 and 50 are made of buoyant material.

A border member, shown as a rope 54, extends alongside said three net supports 46, 48 and 50, being loosely connected to them by extending through staples 56 attached to said three net supports. This rope 54 also extends at the front of the net receptacle portion 44, thus extending completely around the receptacle portion of the net member. Another rope 60 also extends in front of said net receptacle portion 44 and along said side members 18 and 20 for a distance and then along said net member front support 32. This rope 60 extends loosely through staples 56 connected to said side members 18 and 20 and through rings 58 connected to said front support 32. Rings 68 loosely hold said ropes 54 and 60, and wire spreaders 62, later described, together.

Said spreaders 62 may be made of wire and they are attached to cutter supports 64, later described, extending across the front of said receptacle portion 44, from the rear link of one said cutter support to another, and attached to said side members 18 and 20. These spreaders keep the net receptacle portion 44 and said cutter supports 64 from crowding together and they also help scoop the sea moss into said net receptacle portion 44.

I provide flexible supports 64, shown as chains, formed of well-known links movably connected, which support severing members 70, later described. They connect with connectors 66 on said frame front members 12 and 14 and some connect with said cross chain 38 at one end. At the other end they connect with said wire spreaders 62 and rope 60 that extend through the end links of said cutter supports 64. The latter may be four feet long, for instance. Rings 68 further hold said rope 60 and wire spreaders 62 together.

To sever a sea product, such as sea moss growing on rocks under water, I provide severing members 70. These may be formed of wire, such as strands of wire twisted together, for instance, or other suitable material to do the severing or breaking off of the plants at their stems as the apparatus is dragged along the sea bottom. They extend laterally, and may slant across if desired, being spaced apart as shown in FIG. 1. These severing wires are attached to said frame side members 18 and 20 and are fastened to each said support 64 as they extend from one to another across the basic frame, thus serving to keep said supports laterally apart. Spacing of said wires 70 will vary, depending upon the contour and other characteristics of the sea bottom.

While said severing members 70 could be made of other material than wire, I have found that wire is flexible, effective and economical. Sea moss, or other growing sea products, passes into the spaces between said severing members 70 and said supports 64, and in the case of sea moss, the stem is broken off. Then it passes through the open mouth of said net member 30 into said net enclosure portion 44. A rope 74 attached to said rear net support 50 is a convenience in lifting said net member to empty it.

I preferably also provide severing members 76 at the rear of said basic frame 10 that connect with and extend from the rearmost severing member 70 diagonally to said net member enclosure portion 44, being attached to said wire spreaders 62. These provide V-shaped cutters that are a further aid in the harvesting operation.

The bottom of said net receptacle portion 44 could be reinforced, as by rubber strips or chain links attached thereto, to make it last longer. The width and length of my net, as well as the overall size of the whole apparatus can be varied depending, for instance, upon the power of the vessel dragging it.

What I claim is:

1. Apparatus to harvest sea products comprising a basic frame and a receiving net member connected thereto, said frame embodying a front member and two side members spaced laterally apart, a plurality of flexible supports laterally spaced apart, and extending from, and connected to, said front member and said net member, and a severing member extending laterally from and between said side members and attached to said supports.

2. Apparatus to harvest sea products comprising a basic frame and a receiving net member connected thereto, said frame embodying a front member and two side members spaced laterally apart, a plurality of flexible supports laterally spaced apart, and extending from and connected to, said front member and said net member, and a plurality of severing members extending laterally from and between said side members and attached to said supports and spaced apart.

3. Apparatus to harvest sea products comprising a basic frame comprising two side members spaced laterally apart, a receiving net member, a plurality of longitudinally extending, flexible supports spaced apart extending between and attached to said front member and said net, a plurality of severing members extending between said side members and attached to said supports and spaced apart and other severing members extending diagonally from, and attached to, one of said first-mentioned severing members and said net member.

4. Apparatus to harvest sea products, comprising a non-buoyant basic frame and a buoyant receiving net member connected to and extending rearwardly of said frame, said net member embodying two buoyant outer supports at opposite sides, a buoyant rear support and a member connecting said three supports, and a plurality of severing members spaced apart extending laterally across and attached to said frame.

5. Apparatus to harvest sea products, comprising a basic frame embodying two, oppositely disposed, side members, and a receiving net member connected to and extending rearwardly of said frame embodying an upper front portion and a receptacle portion rearwardly thereof, said receptacle portion embodying two outer supports at opposite sides and a rear support, said upper front portion embodying a curved support at the front thereof, a severing member extending laterally across, and attached to, said frame side members, and a flexible member connected to said side and rear supports and to the front portion of said receptacle portion.

6. Apparatus to harvest sea products, comprising a basic frame embodying two side members that are relatively flexible longitudinally and relatively rigid laterally, a plurality of supports spaced laterally apart and extending between and attached to said net and said frame, and being flexible longitudinally, and a plurality of severing members spaced longitudinally apart and extending between, and attached to, said supports and to said side members.

7. Apparatus to harvest sea products, comprising a basic frame embodying a rigid front member and two side members attached to said front member and that are relatively flexible longitudinally and relatively rigid laterally, a plurality of supports spaced laterally apart and extending between and attached to said net and said frame, and a plurality of severing members spaced longitudinally apart and extending between, and attached to, said supports and to said side members.

8. Apparatus to harvest sea products, comprising a basic frame embodying a rigid front member and two side members spaced laterally apart and attached to said frame each embodying links movably connected together that permit a relatively flexible movement longitudinally of said side members and being relatively rigid laterally thereof, a net member embodying a receptacle portion and an upper portion extending forwardly from said receptacle portion, spreader members at the lower front part of said receptacle portion, a plurality of supports connected to said frame front member and to said spreader members and spaced laterally apart, and a plurality of severing members connected to said frame side members and to said supports, extending laterally between said basic frame side members and spaced apart.

9. Apparatus to harvest sea products, comprising a basic frame embodying a rigid front member and two side members spaced laterally apart and attached to said frame each embodying links movably connected together that permit a relatively flexible movement longitudinally of said side members and being relatively rigid laterally thereof, a net member embodying a receptacle portion and an upper portion extending forwardly from said receptacle portion, spreader members at the lower front part of said receptacle portion, a plurality of supports embodying links flexibly connected to each other and to said frame front member and to said spreader members and spaced laterally apart, and a plurality of severing members embodying lengths of wire connected to said frame side members and to said supports, extending laterally between said basic frame side members and spaced apart.

10. Apparatus to harvest sea products, comprising a basic frame embodying a rigid front member and two side members spaced laterally apart and attached to said frame each embodying links movably connected together that permit a relatively flexible movement longitudinally of said side members and being relatively rigid laterally thereof, a net member embodying a receptacle portion and an upper portion extending forwardly from said receptacle portion and having a curved, rigid support at the front edge thereof, attached to said side members, said receptacle portion embodying two buoyant outer supports at opposite sides, a rear buoyant support and an endless, flexible member connecting said three supports and the front of said receptacle portion, spreader members at the lower front part of said receptacle portion, a plurality of flexible supports connected to said frame front member and to said spreader members and spaced laterally apart, and a plurality of severing members connected to said frame side members and to said supports, extending laterally between said basic frame side members and spaced apart, said spreader members extending across said receptacle portion and individually attached to said supports, and another endless flexible member extending around said net member front portion and also across the front of said receptacle portion.

11. Apparatus to harvest sea products comprising a basic, non-buoyant frame embodying oppositely disposed, flexible side members, and a plurality of severing members extending laterally across and attached to said basic frame side members and spaced apart.

12. Apparatus to harvest sea products comprising a basic, non-buoyant frame embodying two oppositely disposed, flexible side members, a buoyant receiving net member connected to said side members at a rear portion thereof, and more than two severing members extending laterally across and attached to said side members forwardly of said net member and spaced apart.

13. Apparatus to harvest sea products comprising a basic frame embodying two oppositely disposed side members, and a receiving net member connected to and extending rearwardly of said frame, said net member embodying a receptacle portion, an upper front portion extending forwardly and upwardly beyond the remainder of said net member and having a rigid support at the front edge thereof connected to said side members and extending upwardly therefrom, and a plurality of severing members extending laterally across and attached to said side members, one said severing member being positioned directly under said upper front portion.

References Cited in the file of this patent
UNITED STATES PATENTS

| | | |
|---|---|---|
| 1,120,206 | Knapp | Dec. 8, 1914 |
| 2,603,051 | Williams | July 15, 1952 |
| 2,684,549 | Olden | July 27, 1954 |